(12) United States Patent
Tong et al.

(10) Patent No.: US 9,754,049 B2
(45) Date of Patent: Sep. 5, 2017

(54) CHARACTERIZING SUCCESS PATHWAYS IN NETWORKED GRAPHS

(71) Applicant: INTERNATIONAL BUSINESS MACHINES CORPORATION, Armonk, NY (US)

(72) Inventors: Hanghang Tong, Ossining, NY (US); Fei Wang, Ossining, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 14/501,960

(22) Filed: Sep. 30, 2014

(65) Prior Publication Data

US 2016/0162600 A1  Jun. 9, 2016

(51) Int. Cl.
*G06F 17/30* (2006.01)
*H04L 29/08* (2006.01)
*G06Q 10/04* (2012.01)
*G06Q 10/06* (2012.01)

(52) U.S. Cl.
CPC ....... *G06F 17/30958* (2013.01); *G06Q 10/04* (2013.01); *G06Q 10/0639* (2013.01); *H04L 29/08* (2013.01)

(58) Field of Classification Search
None
See application file for complete search history.

(56) References Cited

U.S. PATENT DOCUMENTS

| 6,128,606 A | 10/2000 | Bengio et al. |
| 7,263,694 B2 | 8/2007 | Clewis et al. |
| 8,332,333 B2 | 12/2012 | Agarwal |
| 8,346,766 B2 | 1/2013 | Jamjoom et al. |
| 8,478,785 B2 | 7/2013 | Jamjoom et al. |
| 9,032,073 B1 * | 5/2015 | Cuthbert ............. H04L 43/0811 709/224 |
| 2002/0186665 A1 | 12/2002 | Chaffee et al. |
| 2005/0027760 A1 * | 2/2005 | Knobe ................ G06F 12/0269 |

(Continued)

FOREIGN PATENT DOCUMENTS

| EP | 1947623 B1 | 11/2009 |
| EP | 2290545 A3 | 6/2011 |
| EP | 2387758 A1 | 11/2011 |

OTHER PUBLICATIONS

Cao, B. et al, "Detect and Track Latent Factors With Online Nonnegative Matrix Factorization," IJCAI'07. Jan. 2007. pp. 2689-2694.

(Continued)

*Primary Examiner* — Syed Hasan
(74) *Attorney, Agent, or Firm* — Tutunjian & Bitetto, P.C.; Louis J. Percello

(57) ABSTRACT

Methods and systems for inferring performance include a chain graph that has multiple nodes, one or more of which has a known value at a first timestamp. A value associated with a first node at the first timestamp influences a value associated with a second node connected to the first node by an edge at the first timestamp. Each node has an associated chain that represents values of the node at different timestamps. Known values of each node in the graph are propagated within each timestamp to all neighboring nodes. Known values of each node in the graph are propagated across different timestamps.

20 Claims, 3 Drawing Sheets

(56) References Cited

U.S. PATENT DOCUMENTS

| | | | |
|---|---|---|---|
| 2005/0210311 A1 | 9/2005 | Rodeheffer | |
| 2007/0192271 A1* | 8/2007 | George | G06F 15/18 706/52 |
| 2007/0255737 A1 | 11/2007 | Chakrabarti et al. | |
| 2009/0132561 A1 | 5/2009 | Cormode et al. | |
| 2009/0222557 A1* | 9/2009 | Rudy | G06F 17/30867 709/224 |
| 2011/0225112 A1 | 9/2011 | Cameron et al. | |
| 2012/0191425 A1 | 7/2012 | Mott et al. | |
| 2012/0323829 A1 | 12/2012 | Stokes et al. | |

OTHER PUBLICATIONS

Chakrabarti, D. et al., "Evolutionary Clustering," KDD'06. Aug. 2006. pp. 554-560.

Gartner, T. et al., "On Graph Kernels: Hardness Results and Efficient Alternatives," LNAI. Aug. 2003. vol. 2777. pp. 129-143.

Koren, Y. et al., "Measuring and Extracting Proximity in Networks" KDD'06. Aug. 2006. vol. 1. Issue 3. pp. 1-11.

Page, L. et al, "The Pagerank Citation Ranking: Bringing Order to the Web," Jan. 1998. pp. 1-17.

Sun, J. et al., "Less Is More: Compact Matrix Decomposition for Large Sparse Graphs." Apr. 2007. pp. 1-13.

Tong, H. et al., "Colibri: Fast Mining of Large Static and Dynamic Graphs," KDD'08. Aug. 2008. pp. 1-9.

Tong, H. et al., "Fast Random Walk With Restart and Its Applications," Dec. 2006. pp. 1-11.

Tong, H. et al., "Proximity Tracking on Time-Evolving Bipartite Graphs," Apr. 2008. pp. 704-715.

Wang, F. et al., "Efficient Document Clustering via Online Nonnegative Matrix Factorizations," Apr. 2011. pp. 1-12.

* cited by examiner

CHARACTERIZING SUCCESS PATHWAYS IN NETWORKED GRAPHS

STATEMENT REGARDING FEDERALLY SPONSORED RESEARCH OR DEVELOPMENT

This invention was made with Government support under Contract No. W911NF-12-C-0028 awarded by Defense Advanced Research Projects Agency (DARPA). The Government has certain rights in this invention.

BACKGROUND

Technical Field

The present invention relates to performance metrics and, more particularly, to characterizing dynamics of performance across time and social networks using a chain graph.

Description of the Related Art

Measuring performance in a large, multi-actor system can be challenging, such as a large company or a complex process. However, the benefits are substantial. For example, individuals in an organization influence one another through various mechanisms and recognizing poor performance can lead to quickly providing a solution to underlying problems. Similarly, predictions regarding future performance can be made and accounted for.

Left unchecked, poor performance from one actor in the system's structure can affect the performance of others. For example, if one entity or actor is a bottleneck for a given task, poor performance will starve work processes down the chain and prevent them from performing to their potential. Good performance is similarly contagious across the social network graph. For example, particularly good managers will enhance the productivity of everyone working with them. These interconnections provide a means for understanding the operational dynamics of an entire organization.

However, performance metrics are often difficult to apply regularly across an entire organization. There will frequently be gaps in reporting, where one or more people will not provide metrics. The gaps in the data can be substantial, making it difficult to use the metrics to good effect. For example, performance data may be unavailable for a actor in the system. Such cases arise frequently, leaving large holes in the description of the organization.

SUMMARY

A method for inferring performance includes constructing a chain graph that has a plurality of nodes, one or more of which has a known value at a first timestamp. A value associated with a first node at the first timestamp influences a value associated with a second node connected to the first node by an edge at the first timestamp. Each node has an associated chain that represents values of the node at different timestamps. Known values of each node in the graph are propagated within each timestamp to all neighboring nodes. Known values of each node in the graph are propagated across different timestamps.

A method for inferring performance includes constructing a chain graph comprising a plurality of nodes, one or more of which has a known value at a first timestamp. A value associated with a first node at the first timestamp influences a value associated with a second node connected to the first node by an edge at the first timestamp. Each node has an associated chain that represents values of the node at different timestamps. The method includes propagating known values of each node in the graph within each timestamp to all neighboring nodes and propagating known values of each node in the graph across different timestamps. It is determined whether the chain graph has met a convergence criterion and, if not, the steps of propagating a repeated. A state of the chain graph at each timestamp is constructed as a respective matrix that includes each known value of each node in the chain graph along the matrix's diagonal and connection values that characterize a strength of an influence between each pair of nodes at off-diagonal positions. The chain graph is constructed as a block-tridiagonal matrix that includes a state matrix for the graph at each element of the diagonal at respective timestamps and further includes a temporal influence parameter that characterizes a strength of an influence between values for each node at different timestamps.

A system for inferring performance includes a chain graph module configured to construct a chain graph having a plurality of nodes, one or more of which has a known value at a first timestamp. A value associated with a first node at the first timestamp influences a value associated with a second node connected to the first node by an edge at the first timestamp. Each node has an associated chain that represents values of the node at different timestamps. The system further includes a temporal propagation module comprising a processor configured to propagate known values of each node in the graph within each timestamp to all neighboring nodes and to propagate known values of each node in the graph across different timestamps.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present principles exploit network effects in graphs to infer performance for nodes in the graph that do not have reported measurements and to predict performance into the future. It should be understood that the present principles may be applied to any set of entities or actors where the performance of one entity affects the performance of connected entities. The specific mechanism of influence between the connected entities is not important to the present embodiments—only that the influence between two neighboring nodes on the graph can be characterized accurately. Some metric of performance is needed, but for the present purposes it is not important to define precisely what the metric is herein.

The present embodiments use a chain graph representation that encapsulates how a network of nodes evolves over time. The chain graph will not have information for every node at every timestamp to begin with, but the present principles provide for propagation of information from those nodes that do have information to those nodes that do not in accordance with influencing connections between the nodes. Such propagation is also performed across timestamps, so that interruptions in reporting can be filled in and so that predictions of future performance can be made. This temporal propagation is performed both forward and backward in time.

Figure 1:
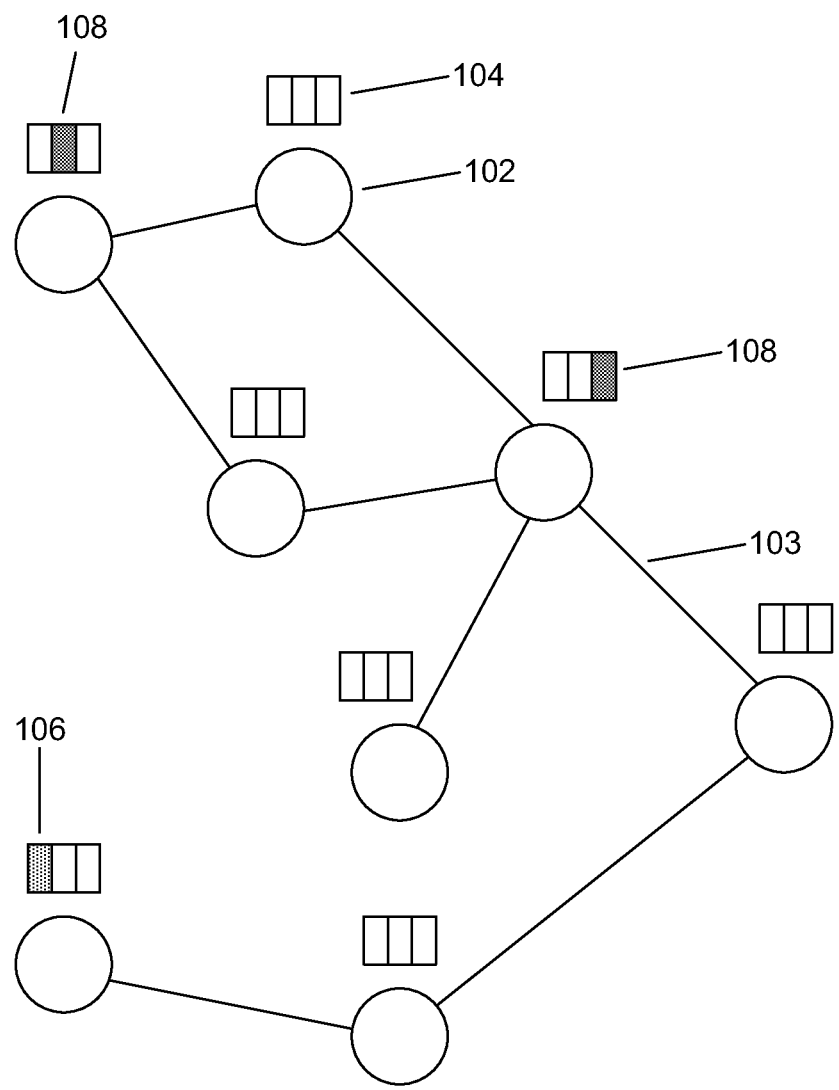
FIG. 1 is a diagram of a chain graph representation of a network where one or more values are unknown in accordance with the present principles.

Referring now to the drawings in which like numerals represent the same or similar elements and initially to FIG. 1, a chain graph representation of a multi-actor system is shown. A set of nodes 102 that represent different actors in the system are shown with graph edges 103 between them. The edges 103 represent influence that the nodes 102 may have on their neighbors and may include a strength of association that determines how strongly the state of a node 102 will affect the states of neighboring nodes 102. At its most general, the graph may therefore be a weighted graph, but this may be simplified to a simple graph where the existence of an influencing connection 103 between nodes 102 is represented by a binary state.

Each node 102 has an associated "chain" 104 that represents the states of that node 102 tracked through time. It is contemplated that the chain 104 may represent measurements of the node's performance at different timestamps, but it should be understood that the present principles apply with equal force to other types of measurements across other dimensions. In the present case, an initial performance measurement 106 is made at a first timestamp. This performance measurement can be propagated across neighboring nodes 102 and across chains 104 to determine values for times and nodes that are unknown. For example, values at timestamps 108 are unknown, but values for them can be predicted based on known measurements. The timestamps may be any length of time and do not need to be uniform.

This can be used for both predictive analysis as well as forensic analysis. In one envisioned use case, the present embodiments can be used to predict whether a given patient will be hospitalized for a disease. Based on a patient network, one can also predict whether a given patient will contract a particular disease. For forensic analysis, the dynamics of personnel status (e.g., determining success via a performance measure, identifying anomalies, etc.) are used to represent the state of the nodes 102. Forensic analysis can also be applied to computer networks to estimate the "health" of each computer at each timestamp. In each case, the more information that is made available in the graph, the more accurate the predictions and forensic reconstructions will be, but gaps in the data are not fatal.

Toward this end, the present embodiments employ iterative propagation of values across the graph, both through connections 103 as well as across the chains 104. This iterative method has a convergence parameter that is selected to guarantee that the iterations will converge to a solution. A parallel solver is used to further speed the inference process, and an online solver is used for predictive analysis.

Figure 2:
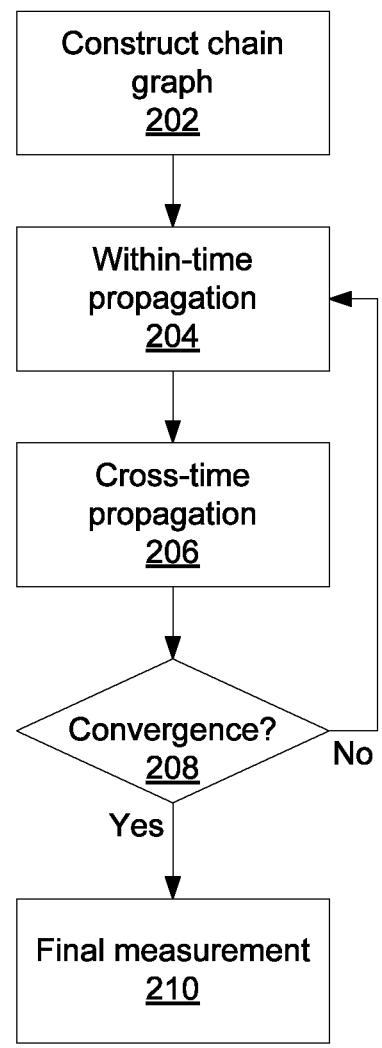
FIG. 2 is a block/flow diagram of a method/system for inferring the value of unknown entries in the chain graph by propagating known information across influencing connections and across time in accordance with the present principles.

Referring now to FIG. 2, a method for propagation of measurements across a chain graph is shown. In block 202, the chain graph is constructed by identifying nodes 102 and the connections 103 between them, including the strength of such connections—represented by the weight of the graph edge 103. Block 204 then propagates information across a single time-stamp of the chain graph based on connections 103. To accomplish this, the effect of each node 102 on neighboring nodes is determined and then, for each node, the effects of its own neighbors are combined to find an updated value. Block 206 performs cross-time propagation to determine the effect of known timestamps on adjacent timestamps. The temporal influence of a node's present state on its future and past states is thereby also taken into account.

Block 208 then determines whether the process has converged to a solution. This may be determined based on whether a difference between a previous iteration and a current iteration is smaller than some threshold. If the iterations have not converged, then processing returns to block 204 and the within-time propagation is performed again. If the iterations have converged, block 210 accesses the final measurements for desired nodes 102 and timestamps.

Part of the step of creating the chain graph in block 202 is to convert the chain graph into a tridiagonal system that characterizes the nodes 102, connections 103, and chains 104 of the chain graph as a matrix that has, as diagonal elements, matrices representing the states of the chain graph at respective timestamps. An exemplary tridiagonal system may be:

$$\begin{bmatrix} (\alpha+\beta)P_0 & \beta I & 0 & \ldots & 0 \\ \gamma I & \alpha P_1 & \beta I & \ldots & 0 \\ 0 & \gamma I & \alpha P_2 & \ldots & 0 \\ \vdots & \vdots & \vdots & \ddots & \vdots \\ 0 & 0 & 0 & \ldots & (\alpha+\beta)P_T \end{bmatrix}$$

where $P_t$ is the state of the chain graph at a time t, I is the identity matrix, $\alpha$ is a convergence parameter, while $\beta$ and $\gamma$ are coupling parameters that weight influences across time. The parameter $\beta$ is a coupling of a timestamp to a future timestamp, while $\gamma$ is a parameter that characterizes the coupling of a timestamp to a past timestamp. For the sake of simplification, it is assumed that $\beta$ and $\gamma$ are equal. Each matrix $P_t$ is an n×n matrix, where n is the number of nodes 102. Element jk of the matrix $P_t$, for elements where $j \neq k$, will have an entry if there is a connection 103 between the nodes, and the value of the entry represents the strength of the connection. For elements where j=k, the value of the entry represents the performance measure of the node 102. The matrices $P_t$ thereby characterize the state of the graph, showing the value and network position of each node 102.

The set of individual nodes is denoted as $X = \{x_1, x_2, \ldots, x_n\}$, where each member $x_n$ of the set represents one node 102 of the chain graph. Furthermore there is a concatenated label vector $y = \{y_0^T\ y_1^T\ \ldots\ y_T^T\}$, where each $y_t^T$ is associated with the set of nodes X at a time t. The present embodiments use a random walk that walks on the chain graph and produces predictions, characterized by a concatenated prediction vector $f^{(s)} = \{(f_0^{(s)})^T\ (f_1^{(s)})^T\ \ldots\ (f_T^{(s)})^T\}$, where each $f_t^{(s)}$ is a prediction vector for the state of the chain graph at the timestamp t.

The random walk rule can be characterized by $f^{(s)} = Pf^{(s-1)} + cy$, where $c = 1 - \alpha - 2\beta$. It can be readily derived that, to get the final solution, the linear equation system $(I-P)f = cy$ may be employed. To solve this set of linear equations, the following symbols are useful:

$$\hat{P} = \begin{bmatrix} \hat{P}_0 & -\beta I & 0 & \ldots & 0 \\ -\beta I & -\hat{P}_1 & -\beta I & \ldots & 0 \\ 0 & -\beta I & \hat{P}_2 & \ldots & 0 \\ \vdots & \vdots & \vdots & \ddots & \vdots \\ 0 & 0 & 0 & \ldots & \hat{P}_T \end{bmatrix}$$

where $$\hat{P}_i = \begin{cases} I(\alpha+\beta)P_i, & \text{if } i=0 \text{ or } i=T \\ 1-\alpha P_i, & \text{otherwise} \end{cases}.$$

$\hat{P}$ is therefore a block-tridiagonal matrix and the problem reduces to $\hat{P}f = cy_0$.

Both sequential and parallel techniques may be used to solve the problem. Changing notation, $\eta_0 = -\beta(\hat{P}_0)^{-1}$ and $\xi_0 = \eta_0 cy_0$. For the rest coefficients in the linear system, the following transformation is performed in ascending order of i from 1 to T:

$$\begin{cases} \eta_i = -\beta(\hat{P}_i + \beta I \eta_{(i-1)})^{-1} \\ \xi_i = \eta_i(cy_i - \xi_{(i-1)}) \end{cases}$$

The final transformation gives a partial solution, $f_T = \xi_T$. Then the complete solution for f can be found by performing the following computation in descending order of i:

$$f_i = \xi_i - \eta_i f_{(i+1)}$$

This produces the complete solution for f. It is worth noting that, in a real system, $\beta$ should be small compared to $\|\hat{P}_i\|_2$ for stability reasons.

A parallel approach may be used to speed the sequential approach discussed above. Pointer jumping takes a linked list of N elements, where each element I has a successor s(i) which is initialized as s(i)=i+1, where $0 \leq i \leq N-2$. Each element sends data to its successor. Pointer jumping performs a data transfer from all the elements to the last node of the list (node N−1) in log(N) iterations. All logarithms discussed herein are base-2. The successor of each element is updated by that successor's successor (s(i)=s(s(i)) unless s(i)=N−1). In each iteration, the data of element I is transferred to the updated successor of i independently of the operations performed by other elements. After log(N) iterations, all the elements complete transferring their data to node (N−1).

Using a parallel processing system, such as a concurrent-read-exclusive-write-parallel-random-access-machine (CREW-PRAM) with P processors, each element of the list is assigned to a processor. The update operations are implicitly synchronized at the end of each pointer jumping iteration. The update process can then be viewed as the execution of the following function T times, given P and cy:

$$\begin{cases} \eta_i \leftarrow f(n_{(i-1)}) \\ \xi_i \leftarrow f(\eta_{(i-1)}, \xi_{i-1}) \end{cases}$$

and $$f_i \leftarrow g(\xi_i, \eta_i, f_{(i+1)})$$

Pointer jumping parallelizes the above sequential process by repeating the following calculations for all applicable i for log(T) times. The computation for each i is performed on a separate processor. Letting k=1, 2, ..., log(T):

$$\begin{cases} \eta_i \leftarrow f(n_{i-2^{k-1}}) \\ \xi_i \leftarrow f(\eta_{i-2^{k-1}}, \xi_{i-2^{k-1}}) \end{cases}$$

and $$f_i \leftarrow g(\xi_i, \eta_i, f_{i+2^{k-1}})$$

As a result, it takes log(T) steps to complete the solution, compared to T steps in sequential execution. When the number of available processors is smaller than T, the above analysis gives the upper bound of the speedup. Pointer jumping does not produce the solutions for the diagonal linear system directly. Instead, it simply eliminates variables. After the elimination, backward substitution is performed to obtain the final output. Since the backward substitution processes one at a time, pointer jumping logarithmizes the backward substitution.

Said simply, the first of pointer jumping partitions data in the matrix P by rows. Each parallel processor then absorbs performs local computations for the row and sends the results to the child (or, more precisely, the processor that handles the row corresponding to the succeeding timestamp). Each parallel processor then absorbs the received information, performs the calculations again taking the received information into account, and sends the results to its grandchild processor—the processor handling data relating to the second succeeding timestamp. This is repeated until it has been iterated log(T) times, with each successive step sending data to the great-grandchild processor If, after calculating graphs from t=0 to t=T, the graph has a minor change at time T+1, a random walk framework provides the $s^{th}$ step of the random walk on the graph of T+1:

$$f_{T+1}^{(s)} = (\alpha+\beta)P_{T+1}f_{T+1}^{(s-1)} + \beta f_T + (1-\alpha-2\beta)y_{T+1}$$

A convergent solution of $f_{T+1}$ is $f_{T+1} = (1-(\alpha+\beta)P_{T+1})^{-1}\theta$, where $\theta = \beta f_T + (1-\alpha-2\beta)y_{T+1}$.

Turning to applications for the present principles, the relationships among, e.g., patients with Alzheimer's disease, can be used to predict performance on, e.g., the mini mental state examination and Alzheimer's Disease Assessment Scale. Given the patients' magnetic resonance imaging (MRI) scan data, the goal is to predict their respective cognitive scores. Using the temporal random walk significantly increases the performance of temporal prediction for both metrics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
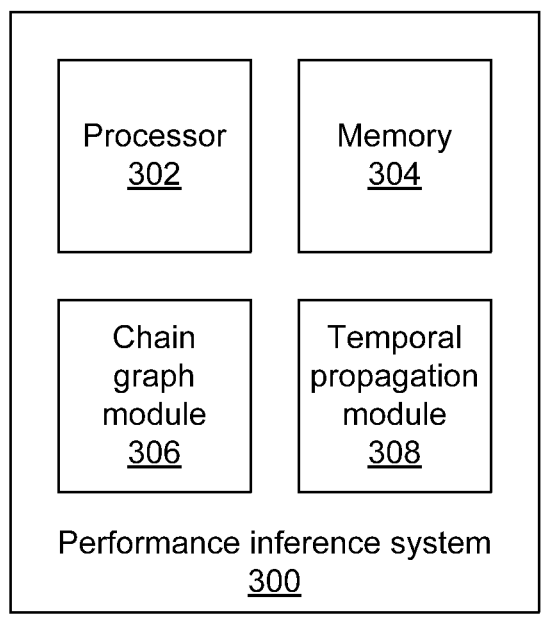
FIG. 3 is a block diagram of a system for inferring the value of unknown entries in the chain graph in accordance with the present principles.

Referring now to FIG. 3, a performance inference system 300 is shown. The system includes a processor 302 and a memory 304. The memory stores information regarding the system to be evaluated, including information about the individuals, the connections between them, and any performance values that have been collected. Block 306 is a chain graph module that constructs a chain graph representation of the information stored in memory 304, where each individual is assigned to a node 102 with connections 103 to other nodes and where each node 102 has a chain 104 that encodes time information.

Temporal propagation module 308 uses the performance measures already present in the chain graph to propagate their effects to other nodes and across time. The temporal propagation module thereby fills in information for the chain graph that was not initially known. It should be recognized that the temporal propagation module 308 may operate serially or may, alternatively, operate in parallel by means of pointer jumping. In the case of parallel processing, the temporal propagation module 308 may be, for example, a multi-core processor or may alternatively be one of several distinct modules in distinct inference systems 300 that share information. In the latter case, the inference system 300 will also include messaging interfaces that allow communication between the respective devices.

It should be noted that FIG. 3 is a general representation of the inference system 300. The distinct modules and hardware components may be implemented separately or together and, indeed, may be separated out into different physical devices. It should be noted in particular that the functions of the modules may be performed as software running on the processor 302 or in a purely hardware embodiment where their functions are implemented as, for example, an application specific integrated circuit. Hence, the modules may be interpreted as being distinct from the processor or, alternatively, may be considered as including one or more processors within them.

Having described preferred embodiments of a system and method for characterizing success pathways in networked graphs (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for inferring performance, comprising:
constructing a chain graph comprising a plurality of nodes, a connection value that characterizes a strength of an influence between pairs of nodes, and a temporal influence parameter that characterizes a strength of an influence between values for each node at different timestamps, one or more of said plurality of nodes having a known value at a first timestamp, wherein a value associated with a first node at the first timestamp influences a value associated with a second node connected to the first node by an edge at the first timestamp, and wherein each node has an associated chain that represents values of the node at different timestamps;
propagating known values of each node in the graph within each timestamp to all neighboring nodes using a processor; and
propagating known values of each timestamp in each node in the graph across different timestamps of each respective node in the graph using the processor.

2. The method of claim 1, further comprising:
determining whether the chain graph has met a convergence criterion; and
repeating said steps of propagating if the chain graph has not met the convergence criterion.

3. The method of claim 1, wherein a state of the chain graph at each timestamp is constructed as a respective matrix that includes each known value of each node in the chain graph along the matrix's diagonal and the connection values.

4. The method of claim 3, wherein the chain graph is constructed as a block-tridiagonal matrix that includes a state matrix for the graph at each element of the diagonal at respective timestamps.

5. The method of claim 4, wherein the block tridiagonal matrix includes the temporal influence parameter.

6. The method of claim 1, wherein propagating known values across different timestamps is performed in parallel.

7. The method of claim 6, wherein propagating known values across different timestamps is performed using pointer jumping.

8. The method of claim 7, wherein pointer jumping is performed in log(T) steps, where T is a number of timestamps in the nodes' chains.

9. A computer readable storage medium comprising a computer readable program for inferring performance, wherein the computer readable program when executed on a computer causes the computer to perform the steps of claim 1.

10. A method for inferring performance, comprising:
constructing a chain graph comprising a plurality of nodes, one or more of which has a known value at a first timestamp, wherein a value associated with a first node at the first timestamp influences a value associated with a second node connected to the first node by an edge at the first timestamp, and wherein each node has an associated chain that represents values of the node at different timestamps;
propagating known values of each node in the graph within each timestamp to all neighboring nodes;
propagating known values of each timestamp of each node in the graph across different timestamps of each respective node in the graph;
determining whether the chain graph has met a convergence criterion; and
repeating said steps of propagating if the chain graph has not met the convergence criterion,
wherein a state of the chain graph at each timestamp is constructed as a respective matrix that includes each known value of each node in the chain graph along the matrix's diagonal and connection values that characterize a strength of an influence between each pair of nodes at off-diagonal positions, and
wherein the chain graph is constructed as a block-tridiagonal matrix that includes a state matrix for the graph at each element of the diagonal at respective timestamps and further includes a temporal influence parameter that characterizes a strength of an influence between values for each node at different timestamps.

11. The method of claim 10, wherein propagating known values across different timestamps is performed in parallel using pointer jumping.

12. The method of claim 11, wherein pointer jumping is performed in log(T) steps, where T is a number of timestamps in the nodes' chains.

13. A system for inferring performance, comprising:
a chain graph module configured to construct a chain graph having a plurality of nodes, a connection value that characterizes a strength of an influence between pairs of nodes, and a temporal influence parameter that characterizes a strength of an influence between values for each node at different timestamps, one or more of said plurality of nodes having a known value at a first timestamp, wherein a value associated with a first node at the first timestamp influences a value associated with a second node connected to the first node by an edge at the first timestamp, and wherein each node has an associated chain that represents values of the node at different timestamps; and a temporal propagation module comprising a processor configured to propagate known values of each node in the graph within each timestamp to all neighboring nodes and to propagate known values of each timestamp of each node in the graph across different timestamps of each respective node in the graph.

14. The system of claim 13, wherein the temporal propagation module is further configured to determine whether the chain graph has met a convergence criterion and to repeat propagation if the chain graph has not met the convergence criterion.

15. The system of claim 13, wherein a state of the chain graph at each timestamp is constructed as a respective matrix that includes each known value of each node in the chain graph along the matrix's diagonal and the connection values.

16. The system of claim 15, wherein the chain graph is constructed as a block-tridiagonal matrix that includes a state matrix for the graph at each element of the diagonal at respective timestamps.

17. The system of claim 16, wherein the block tridiagonal matrix includes the temporal influence parameter.

18. The system of claim 13, wherein the temporal propagation module is further configured to perform propagation across different timestamps in parallel.

19. The system of claim 18, wherein the temporal propagation module is further configured to propagate known values across different timestamps using pointer jumping.

20. The system of claim 19, wherein pointer jumping is performed in log(T) steps, where T is a number of timestamps in the nodes' chains.

* * * * *